US006256677B1

(12) United States Patent
Pribnow et al.

(10) Patent No.: US 6,256,677 B1
(45) Date of Patent: *Jul. 3, 2001

(54) MESSAGE BUFFERING FOR A COMPUTER-BASED NETWORK

(75) Inventors: Richard D. Pribnow; Michael T. Bye, both of Chippewa Falls, WI (US); James G. Bravatto, Inver Grove Heights; John Theodore Kline, Apple Valley, both of MN (US)

(73) Assignee: Silicon Graphics, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,233

(22) Filed: Dec. 16, 1997

(51) Int. Cl.[7] ................................................. G06F 13/24
(52) U.S. Cl. ............................................. 709/250; 710/262
(58) Field of Search .................................. 709/236, 235, 709/250; 710/33, 114, 52, 261–269; 340/825.51, 825.12

(56) References Cited

U.S. PATENT DOCUMENTS

| 5,193,149 | * | 3/1993 | Awiszio et al. ........................ 395/200 |
| 5,257,374 | | 10/1993 | Hammer et al. ....................... 395/650 |
| 5,303,348 | * | 4/1994 | Botzenhardt et al. ................ 395/325 |
| 5,307,459 | * | 4/1994 | Peterson et al. ...................... 395/275 |
| 5,315,580 | * | 5/1994 | Phaal ...................................... 370/13 |
| 5,353,412 | * | 10/1994 | Douglas et al. ....................... 395/325 |
| 5,371,736 | * | 12/1994 | Evan ....................................... 370/79 |
| 5,517,500 | * | 5/1996 | White et al. ......................... 370/85.1 |
| 5,539,729 | * | 7/1996 | Bodner .................................... 370/18 |
| 5,541,912 | * | 7/1996 | Choudhury et al. ................... 370/17 |
| 5,613,129 | * | 3/1997 | Walsh ................................... 395/740 |
| 5,721,955 | * | 2/1998 | Cedros et al. ........................ 395/853 |
| 5,768,530 | * | 6/1998 | Sandorpi .............................. 709/263 |
| 5,797,041 | * | 8/1998 | Yasue et al. ........................... 710/52 |
| 6,038,607 | * | 3/2000 | Hamilton et al. .................... 709/236 |

FOREIGN PATENT DOCUMENTS

| 0359241 | 3/1990 | (EP) | ............................... G06F/15/16 |
| 0378401 | 7/1990 | (EP) | ............................... G06F/13/42 |
| 0646876 | 4/1995 | (EP) | ............................... G06F/15/16 |

* cited by examiner

*Primary Examiner*—Mehmet B. Geckil
(74) *Attorney, Agent, or Firm*—Schwegman, Lundberg, Woessner & Kluth, P.A.

(57) ABSTRACT

A ring computer network system having a communication controller for controller the receipt and sending of packets or messages at each client computer. The interface associated with each client computer includes a send message buffer and a receive message buffer. The send message buffer has a send message buffer counter which increments upwardly in response to messages being received from the client computer for sending on the ring network. The communication controller sends messages from the send buffer until the send message buffer counter reaches the address or a value associated with the last received message. Similarly, the receive message buffer includes a receive message buffer counter which increments as each message is received to a receive message buffer counter value. The receive message buffer is emptied until the receive message buffer counter value is reached. The receive buffer can also have a foreground portion and a background portion. The send buffer can also have a background portion and a foreground portion of memory. The communication controller continually switches between the foreground and background portions of memory and redesignates each memory portion after the switch. The communications controller can also recognize priority schemes for the messages.

28 Claims, 8 Drawing Sheets

MESSAGE BUFFERING FOR A COMPUTER-BASED NETWORK

FIELD OF THE INVENTION

The present invention relates to computer systems and in particular to a network-based computer system.

BACKGROUND

Modular, highly interconnected computer network systems offer the ability to exchange data among individual nodes in the network and to share hardware resources. Many networks move large amounts of data and many messages between the nodes on the network. Due to the large amounts of data movement in such a system, communication traffic among the nodes can become congested. Messages and data are sent in self-contained packets which have the needed address, command and data. Packets can be sent from a source to a target through several intermediate nodes. This saves time and congestion since the processors do not wait for each message to travel the length of the network before sending the next packet.

There are still problems associated with messages sent from a source to a target in a network computer system. One of the problems is that latency or time delays can be caused in central processing units which are either the source or target for multiple messages. Currently, as each message packet is received, it produces an interrupt. The central processing unit must respond to each interrupt before the next message can be received. This is not a problem in many computer systems. However, in network-based systems, multiple messages may have to be received by a central processing unit at any given time. Multiple messages produce multiple interrupts. In the instance when multiple messages arrive at a central processing unit at about the same time, the CPU is only capable of handling the messages serially and must respond to an interrupt for a first message and service the interrupt before the next message interrupt can be responded to and serviced. When multiple messages arrive at a CPU, the CPU may spend an inordinate amount of time processing the various interrupts associated with the messages. This problem is exacerbated in a network-based system where it is more common for a particular CPU to have to process multiple messages. When a CPU or central processing unit has to service a number of messages, many times latency can be introduced into the particular computer system. In other words, the CPU which has to service multiple messages is spending more time servicing interrupts associated with the multiple messages than doing other operations. The other operations can be delayed as a result, and this is referred to as latency due to system overhead and results in an increased response time of a particular central processing unit. There is a need for a central processing unit for use in a network system that can efficiently receive and handle multiple messages. There is also a need for a CPU that can handle multiple messages in a stream and which can handle multiple messages with one pass through its operating system. There is also a need for a system or CPU which can handle multiple messages with one interrupt. Such a system could check to see if additional messages have arrived while a first interrupt for a message is being processed. There is also a need for a CPU that spends less time servicing multiple interrupts from multiple messages and spends more of its time on other jobs. There is also a need for a computer system that has a reduced set of instructions for dealing with the receipt of packets or messages from a network. There is also a need for a more efficient way to send messages to a target client computer on a network and to receive messages or packets from the network. Such a system would handle messages more effectively which would produce a network having increased speed and lower overhead in terms of an instruction set and clock cycles being used.

SUMMARY OF THE INVENTION

A computer for use in a network system has a communication controller for controlling the receipt and sending of packets or messages at each client computer. The interface associated with each client computer includes a send message buffer and a receive message buffer. The send message buffer has a send message buffer counter which increments upwardly in response to messages being received from the client computer for sending on the ring network. The communication controller sends messages from the send buffer until the send message buffer counter reaches the address or a value associated with the last received message. Similarly, the receive message buffer includes a receive message buffer counter which increments as each message is received to a receive message buffer counter value. The receive message buffer is emptied until the receive message buffer counter value is reached. The receive buffer can also have an active portion and an inactive portion. This can also be called a foreground portion and a background portion. The communication controller continually switches between the active and inactive portions of memory and redesignates each memory portion after the switch. The communications controller can also recognize priority schemes for the messages.

Advantageously, the communication controller allows for minimal interference when transferring messages. The communication controller allows for minimal interruption of this processor when transferring messages in and out of a receive buffer or send buffer. Since the communication controller increments a receive packet counter (RPC) within the receive buffer when messages are input to a buffer to produce a counter having an address or a value associated therewith that is reflective of the last received message, when outputs need to be sent from the send buffer, the communication controller can merely send messages until the value of the counter is equal to the value associated with the limit address for a particular message. When the counter value equals the address associated with the limit of the message, then the communication controller stops sending messages. The advantage is that in the past, various flags and interrupts had to be used to indicate when a single message was complete. For example, if four messages had to be sent, four interrupts would be processed by the processor from the communications controller to receive the four messages. Under the current communications controller, time is saved since the messages into the buffer do not require the processing of an interrupt. The messages are received and an RPC counter is incremented to reflect the receipt of the message. Therefore, several messages can be processed after an initial interrupt has begun processing. The subsequent messages do not need to process an interrupt. If subsequent messages are received in memory, the RPC may be incremented before the CPU completes the previous interrupt. By the same token, when sending messages out of the send buffer, a number of message end interrupts do not have to be processed. The end result is that multiple messages or packets can be sent or received into the receive buffers, with minimal overhead and minimal processing.

DETAILED DESCRIPTION

In the following Detailed Description, reference is made to the accompanying drawings which form a part hereof and in which is shown by way of illustration specific embodiments in which the invention may be practiced. These embodiments are described in sufficient detail to enable those skilled in the art to practice and use the invention, and it is to be understood that other embodiments may be utilized and that changes may be made without departing from the spirit and scope of the present invention. The following Detailed Description is, therefore, not to be taken in a limiting sense and the scope of the present invention is defined by the appended claims.

Figure 1:
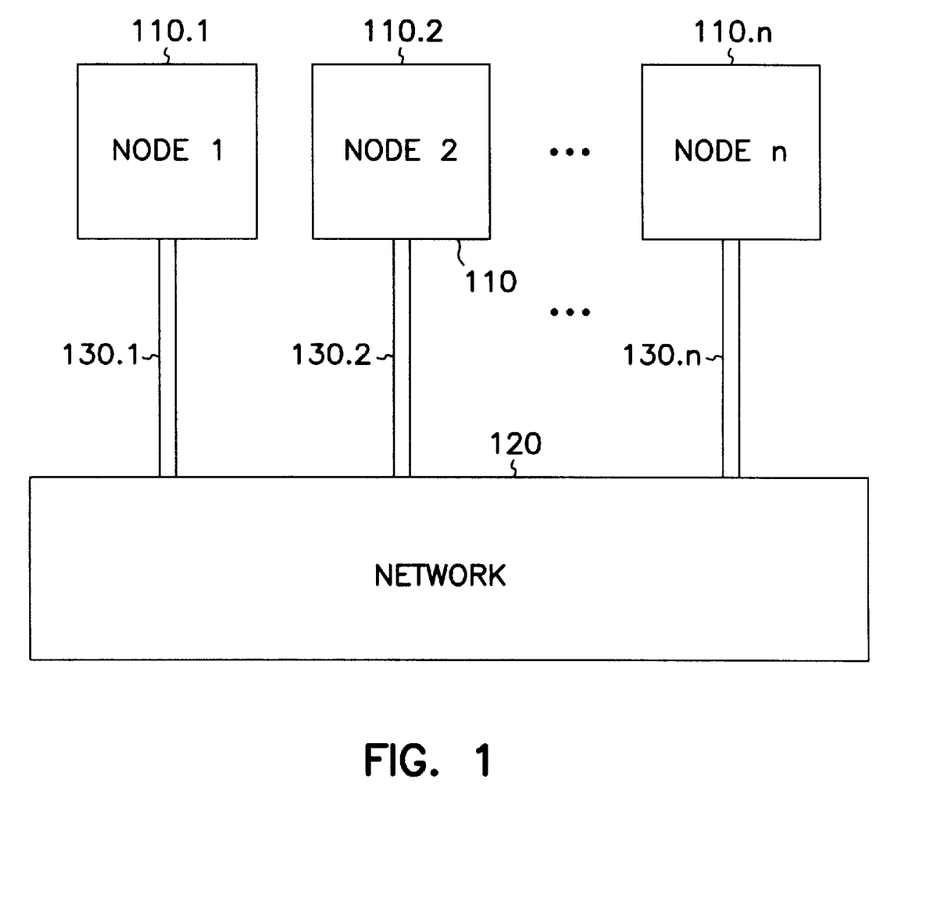
FIG. 1 is a block diagram of a plurality of client computers connected across a network.
Figure 2:
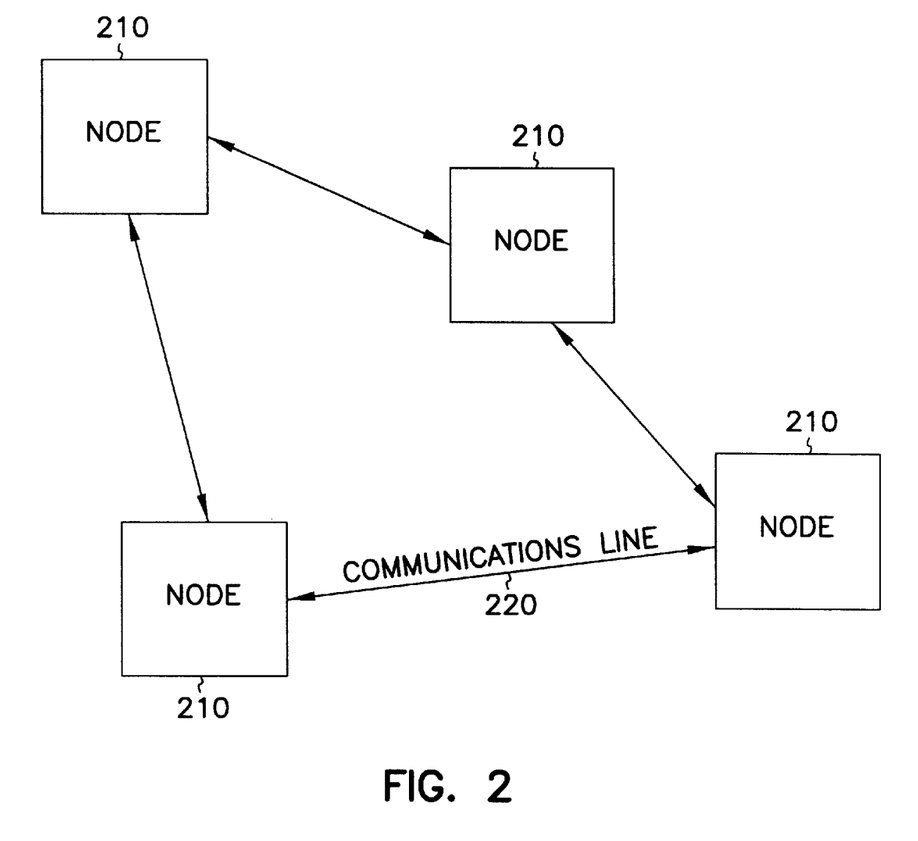
FIG. 2 is a block diagram of a ring network topology which could be used in the system of FIG. 1.

FIG. 1 shows a generic computer network system comprising a plurality of computer devices, called nodes 110, connected to the network 120 by a communication line 130. FIG. 2 demonstrates one possible topology of such a computer network system. Here, the nodes 210 are connected by the communication line 220 to form a ring network. Packets can be sent in either direction on communication line 220. Communication line 220 may be any type of transmission media, including twisted pair, coaxial cable or optical fiber. Having data moving in both directions along the communication lines does, however, require a high level of management to avoid data collisions.

It should be noted that although a ring network is described in this application, as an example environment for this invention, the invention can be used for any type of computer network configuration.

Figure 3:
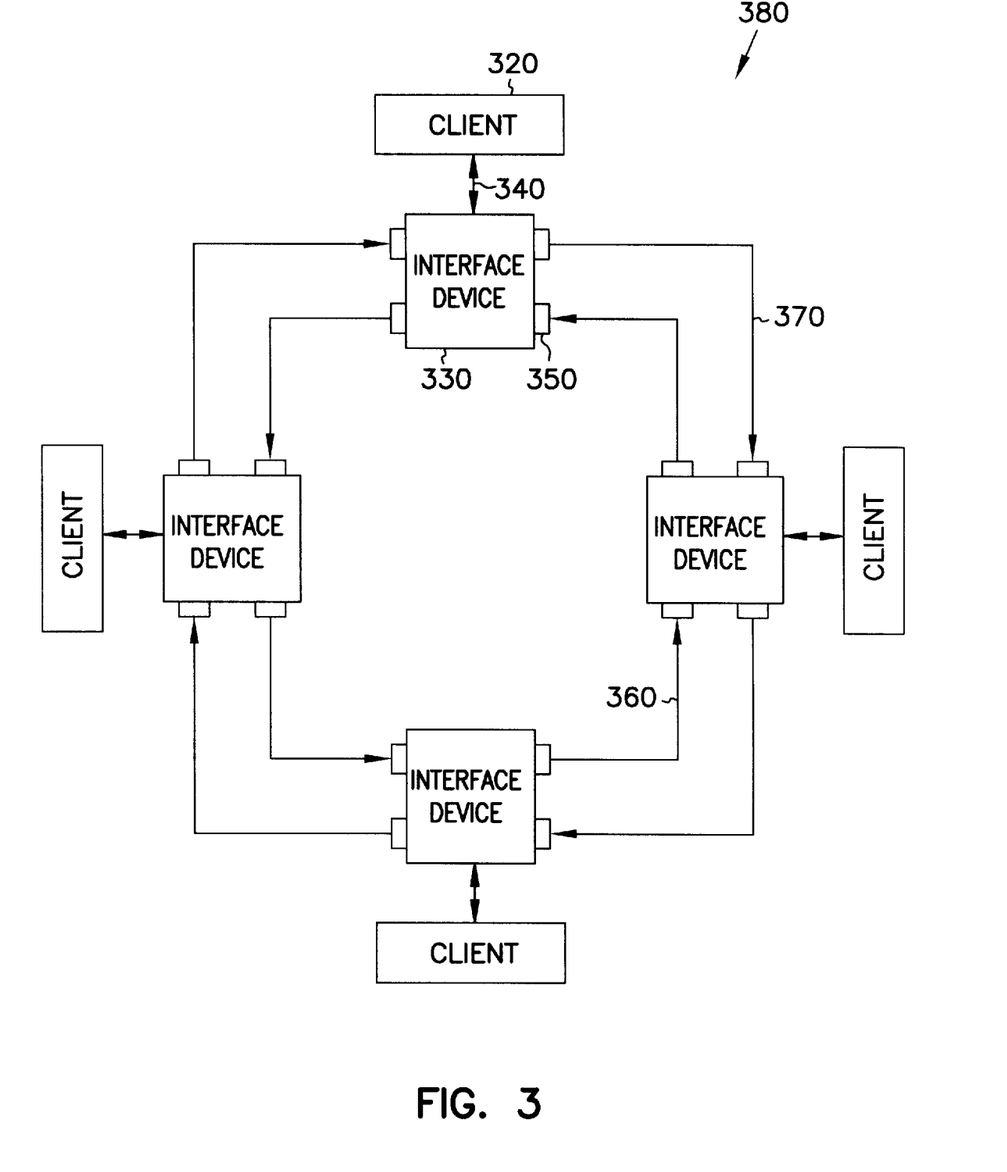
FIG. 3 shows a peripheral channel ring network having four nodes.

One way to decrease the amount of traffic management required is to implement communication line 220 as two separate unidirectional lines. This approach is shown in FIG. 3. FIG. 3 shows a dual-ring peripheral channel 380 in which traffic moves clockwise on one ring and counter-clockwise on the other ring. This substantially decreases the policing necessary on the communication line since all data is traveling in the same direction single-file. The redundancy provided by the double rings and their counter rotating orientation provide the ability to continue operation during addition, removal or hot swaps of client nodes or in the presence of a faulty link or node. This makes the network highly fault tolerant.

Peripheral channel 380 includes a number of nodes 310 connecting to each other by counter-rotating rings 360 and 370. Each node 310 includes a client 320 and an Interface Device 330. In one embodiment, Interface Device 330 can be implemented as a single ASIC. Interface Device 330 could also be implemented as a computer board or as an external device connecting the client and peripheral channel 380 via cable. Client 320 may be a standalone computer or workstation. Client 320 could also be a peripheral device such as a disk array. In one system, client computer 320 communicates with bulk memory devices across peripheral channel 380. In another embodiment, a massively parallel processing system (MPP) communicates with other computer systems and with bulk memory across peripheral channel 380. In such an embodiment, interface device 330 is connected to processors within the MPP systems via an I/O Controller. In one embodiment, Interface Device 330 contains a 32-bit wide channel port 350 for each of the dual network channels and a 64-bit bidirectional client port interface 340 for communication with client 320. In one embodiment, rings 360 and 370 are implemented the same way that a single ring is implemented in a Scalable Channel Interface. Other methods of interconnection could also be used without departing from the scope of the invention.

In one embodiment, rings 360 and 370 are used for active data traffic. They operate independently and interact only at the port interfaces. Traffic does not switch between the two rings. Having two active rings increases the rate of data transfer over that of a single-ring network.

Figure 4:
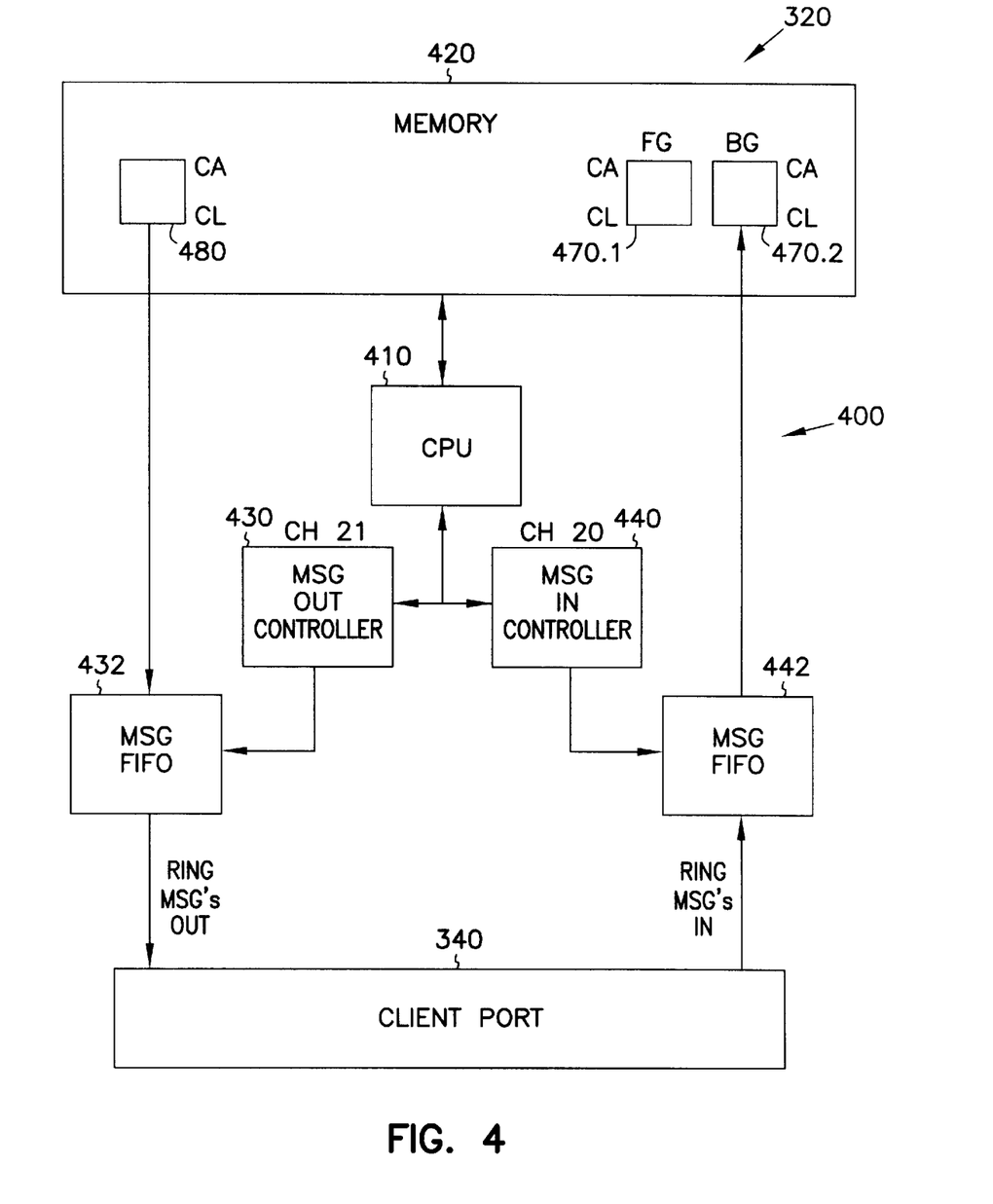
FIG. 4 shows a schematic diagram of the an interface device used on a ring network.

FIG. 4 is a block diagram of a portion of a client 320 that interfaces with the client port 340. The portion of client 320 is a block diagram of the message-handling hardware 400 that handles incoming and outgoing messages or packets. The message-handling hardware 400 is part of the communications controller. As shown in FIG. 4, the client 320 includes a central processing unit 410 and memory 420. The memory 420 includes a send buffer 480 and a receive buffer 470.1, and a receive buffer 470.2. Each of the buffers 470.1, 470.2, and 480 are buffers that are relocatable within memory by registers pointing to the current address and the limit address. Each of these buffers has a counter which reads the current address and a counter which reads the limit or end address. It should be noted that the send buffer 480 could also be set up as a pair of send buffers similar to the receive buffers 470.1 and 470.2. The message-handling system 400 includes a message out controller 430 and a message in controller 440. Both the message in controller 440 and the message out controller 430 include dedicated hardware and software which are under the high-level control of the central processing unit 410. For example, to handle messages being sent from the send buffer 480, the CPU merely passes the task off to the message out controller 430, which is also called CH 21. The message out controller is dedicated to handling the messages out of the buffer 480 and has dedicated hardware and software for accomplishing this task or the tasks associated therewith. Similarly, the message in controller 440 has hardware and software which is dedicated to handling the messages in from the client port 340 as they pass into the receive buffers 470.1 and 470.2 in the memory 420. The message out controller 430 also controls a message FIFO 432. The message FIFO receives messages sent from the send buffer 480 and holds them for sending them to the client port 340. Similarly, the message in controller 440, also known as CH 20, also controls a message FIFO 442 which receives messages from the client port and places them into the receive buffers 470.1 or 470.2. It should be noted that should one of the FIFOs 442 or 432 become full, the system is capable of applying back pressure to a source. For example, if a source computer is sending messages targeted for one particular client, the message FIFO 442 associated with that client may become full or may get close to being full. To assure that no messages are lost, a message can be sent to the source computer to prevent it from sending messages to the particular target. Client 320 is connected to Interface Device 330 via bidirectional client port 340.

The traffic in peripheral channel 380 is organized into packets, which are sent from a source node to a target node. A packet is transmitted on one of the channel rings, passing through the intermediate nodes, until it reaches its target node. The target node removes the packet from the channel and replies with an echo packet. The source node retains a copy of the send packet until it receives the corresponding echo packet. The echo informs the source whether the send packet was successfully received at the target node or was busied. If the packet was accepted, then the source node releases the buffer space consumed by the send packet. If the packet was busied, then the source node retransmits the send packet.

Packets coming into the node's Interface Device 330 first go through phase corrector and decoder to align the packets with the Interface Device environment. The packets are then interpreted by a parser and either passed through the node or stripped by Interface Device 330 and routed into receive buffers 470. Packets arriving from client 320 are assembled in an active send buffer 480 and pass through the client port 340 before entering peripheral channel 380 itself.

The peripheral channel 380 and interface device 330 may also be configured as a dual-ring system or as a single-ring system. The client 320 uses a communications management system to manage the receiving and sending of packets coming across the client interface 340 to and from the interface device 330. Regardless of whether the network system is a single-ring, dual-ring system or a multiple-ring system, the communications management system will manage the receive buffers 470 for receiving packets or messages from the channels 310 and outputting those messages or packets to the client via the client port 340 in the same manner. Similarly, the communications management system will also manage the send buffers 480 for sending messages from the client 320 to the client port 340 and interface devise 330 of the network. Communications management can be implemented in a number of ways. In this particular system, the communications management is configurable in the operating system of any processor in the client computers is assigned this task.

This invention focuses on the management of the receive buffers 470 and the send buffers 480. The general operation of both the receive buffers 470 and the send buffers 480 will first be discussed. After this general discussion of the general operation, the specific instruction sets will then be set forth.

Management of Receive Buffers and Send Buffers

Figure 5:
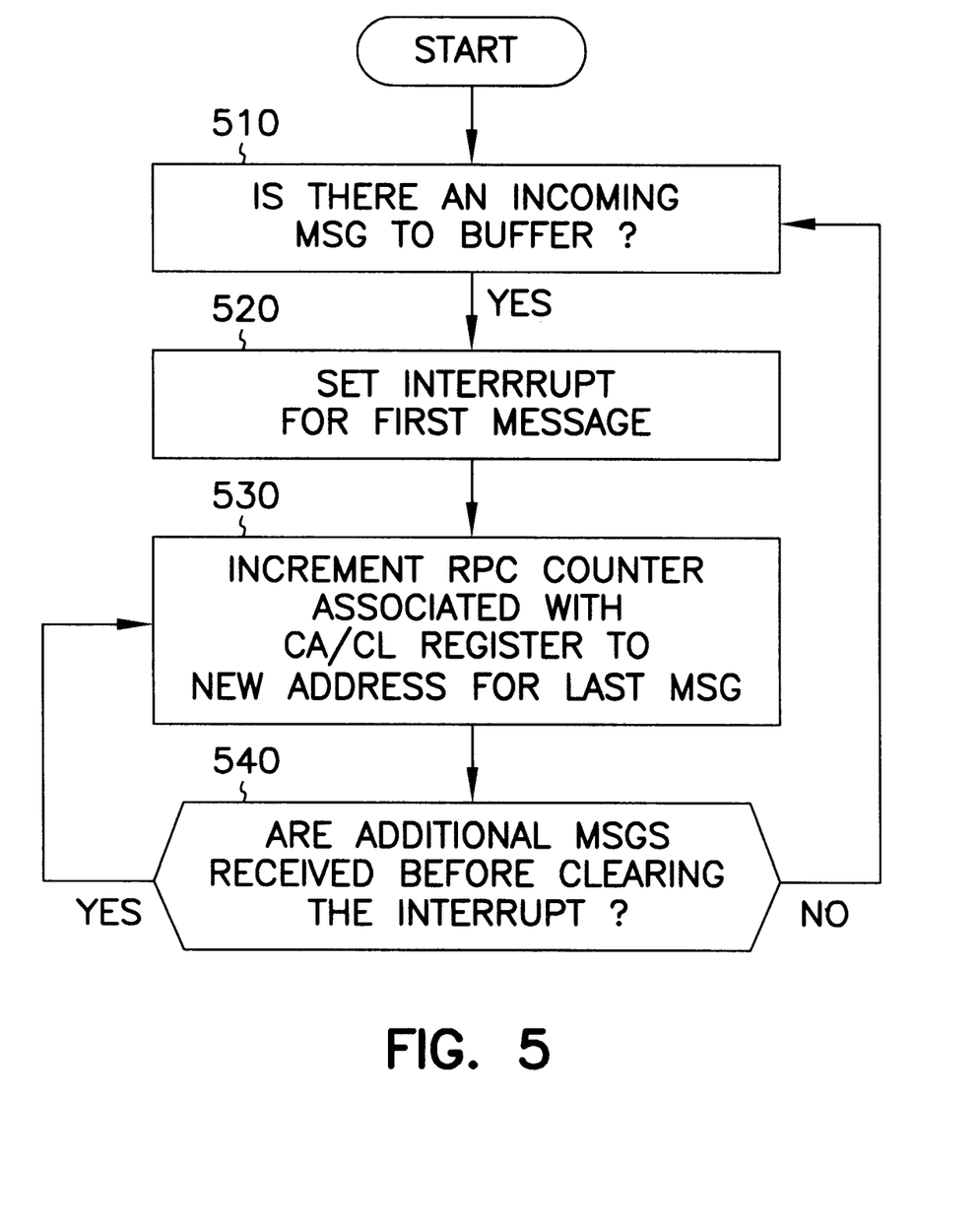
FIG. 5 is a flowchart showing the steps for the communications controller in receiving messages or packets within a buffer.

The general operation of the receive buffers 470 and the active send buffers 480 will now be discussed by referring to the flowchart shown in FIG. 5. FIG. 5 is a flowchart showing the steps that the communication controller implements in receiving messages or packets within a buffer, such as message out controller 430 or message in controller 440. Each buffer 470.1, 470.2 or 480 is assigned a place in memory 420 by software which is equal to n messages long. When a message is received, it is added to the buffer 470 by the message in controller 440 (CH 20). Associated with message in controller 440 (CH 20) are a pair of counters. As each message is added to the buffer 470.1, one of the counters is incremented to indicate the address where the last message or packet is stored. As additional packets or messages come in, the counter is again incremented to reflect a new ending address where the last packet or message is stored. Advantageously, as a new message or packet is placed into the buffer 470.1, it is merely placed in the buffer rather than having to produce an interrupt which has to be recognized by the CPU before another message or packet is placed into the buffer 470.1. This is advantageous since several or multiple messages can be input into a buffer 470.1 at any time. This reduces the overhead associated with the communications manager since interrupts do not have to be responded to in order to add messages to the message buffers 470.1. This also saves time since the messages can be merely appended to a buffer 470.1 and a counter can be incremented to reflect the address associated with the last message.

As shown by reference numeral 510, the initial step is to determine whether or not there is an incoming message to the buffer 470.1. If there is no incoming message or packet, no action is taken. If there is an incoming message, the controller 440 responds by sending the message to 470.1. The interrupt is then set as shown as step 520, and the RPC counter associated with a CA/CL register 470.1 is incremented to reflect the new address for the last message, as shown in step 530. The next step, depicted by reference numeral 540, is to determine if additional messages have been received. If no additional messages have been received, the buffer is reset and awaits the next interrupt as shown by the line going back to the step 510. If additional messages have been received, the additional messages are added to the buffer and the counter associated with the last address is then incremented to reflect the new last address associated with the last message or packet received, as depicted by the line to step 530. The steps shown in FIG. 5 are associated with any buffer, such as receive buffer 470.1, having a single buffer associated therewith. Each message going to a receive buffer could produce an interrupt, but software allows the CPU to disregard interrupts received during the time an interrupt for a message is being processed. By processing multiple messages with one interrupt, this frees up the CPU to attend to other tasks, thereby reducing latency associated with completing the other tasks.

In one preferred embodiment, each receive buffer 470 is comprised of at least two buffers 470.1 and 470.2 which are allocated in memory. This is advantageous since it allows for noncontiguous allocations of memory. Typically, one portion or buffer will be called the foreground as shown by the label FG on buffer 470.1. The foreground is the portion of the memory into which messages or data packets are received. Once the foreground or portion of the memory is filled, the communications controller will add future packets to the background (shown by the label BG on buffer 470.2) and bring the background into the foreground. In other words, when the foreground is filled, it is turned or redesignated the background and the other portion of memory, formerly designated as the background, now turns into the foreground or portion of memory.

Figure 6:
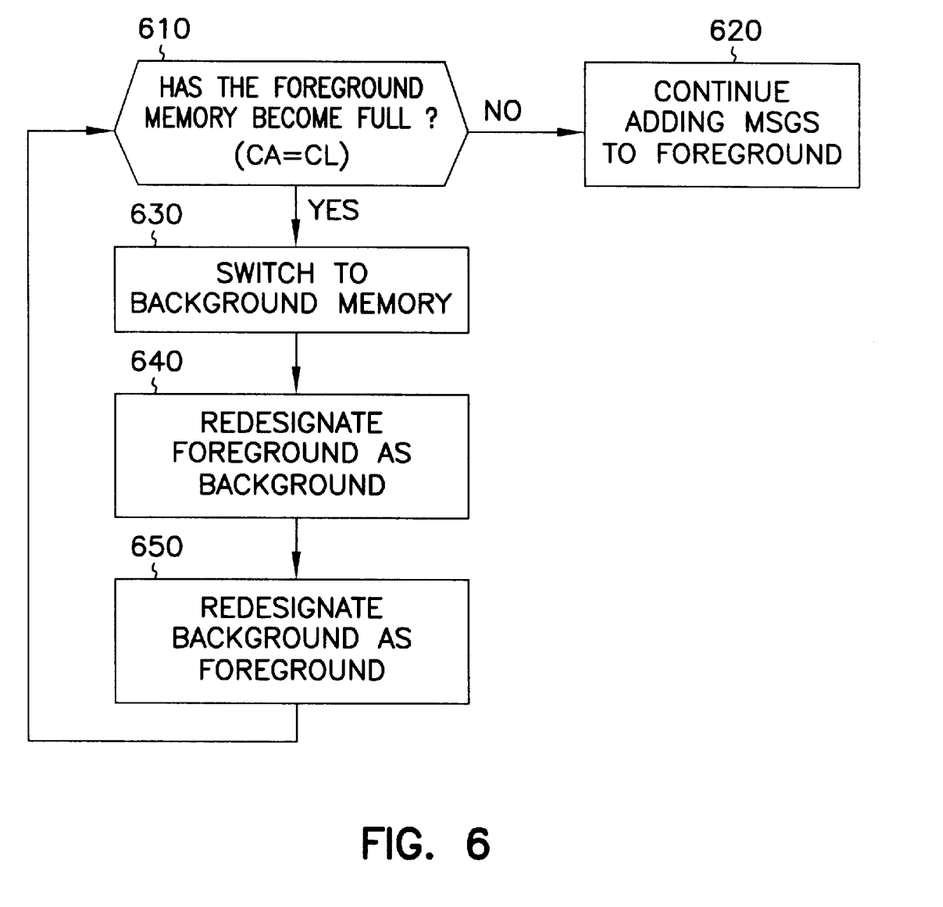
FIG. 6 is a flowchart showing the steps in addition to those shown in FIG. 5 for handling communications in a message receive buffer where the message receive buffer has a foreground and a background region in memory.

FIG. 6 is a flowchart showing the steps which are executed in addition to those shown in FIG. 5 for handling communications in a message receive buffer 470 having a first portion of memory and a second portion of memory or having two buffers. One of the buffers 470.1 is designated as the foreground and the other buffer of the receive buffer 470.2 is designated as the background. The buffers continually swap between the foreground and background as each becomes fall. The foreground is where the transfers will take place from. The background is another set of registers where either the last transfer just finished or where the next transfer will happen. After a switch from foreground to background, the processor will process the final packet(s) then set up the background for the next transfer. This is happening while the foreground is transferring messages. Inactive starts after the last message is received and the register set changes to background. Inactive ends when the CPU sets up the background for the next transfer. This is when the background goes active. Thus, it is possible to have both foreground and background active (or inactive). Two actives are quite normal. Two inactives are not. Two inactives means that the foreground cannot receive messages. This system allows the CPU an amount of time to set up the background without a fear of losing or holding up messages.

It should be noted that the receive buffer could be comprised of more than two buffers. Multiple foregrounds or backgrounds could be implemented. In addition, the use of multiple buffers could also be used as the send buffer. The send buffer 480 could be formed of a background and foreground or of multiple foregrounds and backgrounds.

Software will service the interrupt and reset the CA/CL registers to the inactive background and reset it to active. As shown by reference numeral 610, the first step is to determine whether the foreground memory has become full. If the foreground memory is not full, incoming messages to the receive buffer 470 are appended to the foreground buffer as depicted by step 620 of course, as new messages are added to the foreground, the counter associated with the buffer is incremented to reflect the new last message address (shown in step 530 in FIG. 5). If the foreground memory has become full, the communications manager switches to the background memory and adds the new incoming messages to the background memory, as depicted by step 630. Once the switch between foreground and background has been made, the communications controller redesignates the foreground as the background, as depicted by step 640. Similarly, what was previously the background, now becomes designated as the foreground, as depicted by step 650. Steps 630, 640 and 650 may happen substantially simultaneously within the communications manager. After step 650, the communications manager goes back to monitoring and determining whether the foreground memory has become full, as depicted by step 610. Once the foreground memory has become full, steps 630, 640 and 650 are repeated. The foreground and background memory is most commonly implemented with the receive buffers 470.

Figure 7:
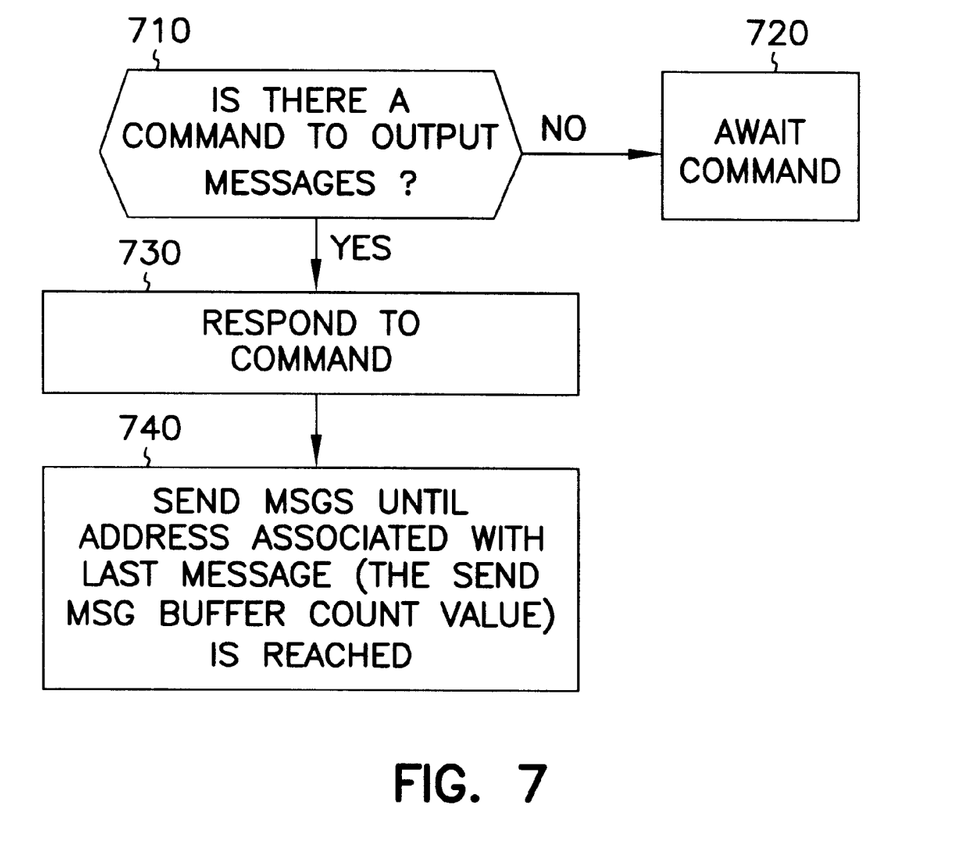
FIG. 7 is a flowchart for outputting messages from a buffer.

FIG. 7 shows a flowchart for outputting messages from a buffer, such as send buffers 480. As mentioned previously, each buffer has two counters associated therewith. As the messages are sent, the first counter increments to reflect the address associated with the last message sent. The other counter maintains the ending address of the last message in the buffer which needs to be sent. This is the limit address. Sending messages or packets of data is a straightforward process of incrementing the beginning address counter as each message is output from the buffer to reflect the address associated with that particular message or packet. When the beginning address counter is incremented up to the limit address of the last message, then the buffer knows to stop outputting messages. Advantageously, as messages are being sent from the buffer, other messages may be appended to the buffer. As a message is added, the limit address is incremented to reflect the last address associated with the last message received. The communications manager does not have to respond to an interrupt to take in the added message and the address counter associated with the beginning address of the messages being sent will continue until the address counter reaches the new limit address associated with the last message added. In this way, messages can be added while another portion of the buffer is sending messages. No interrupts have to be responded to and the operation of sending can continue as the buffer has new messages added.

As shown in FIG. 7, the first determination is whether there is a command to output messages, which is depicted by step 710. If there are no such commands, the communication controller merely awaits the command, as depicted by reference numeral 720. If there is such a command, the communications controller responds to it, as depicted by reference numeral 730. The communications controller then sends messages until the address associated with the current message being sent is equal to the address associated with the last message received, as depicted by step 740. The last-known address associated with the buffer may also be referred to as the buffer count value. Even after the limit address has been reached, additional messages can be added and the limit address changes and the communications controller will become active again and send the added messages. Interrupts are only generated when the beginning address counter equals the limit address.

There are several enhancements that can be implemented in a network to prioritize outgoing packets of information or data and/or messages. For example, the communications management system could recognize multiple beginning and end addresses like the receive controller, and implement a foreground/background configuration. In addition, the packets could carry indicators reflective of the information contained in the packet. Such an information indicator could also be used to prioritize the information that is to be sent. Another way to prioritize the data or message associated with a packet is to indicate the source of the message and the target to where the message is to be sent. Certain clients 320 on a network may perform functions which gain priority over other clients attached to the network and, therefore, the messages targeted for that particular client computer or microprocessor or messages from a particular client or microprocessor can be prioritized as desired.

Yet another way to prioritize would be to add particular messages to a particular foreground when multiple foregrounds are associated with a send buffer 480 or receive buffer 470.

Figure 8:
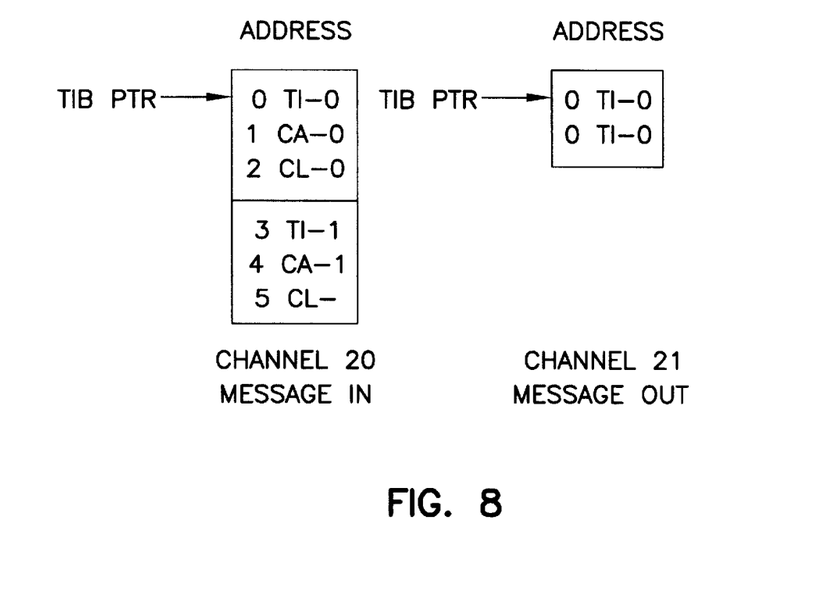
FIG. 8 is a block diagram of several registers associated with several channels of a ring-network.

Now turning to FIG. 8, there is shown several registers associated with channel 20, channel 21, channel 22 and channel 23.

The peripheral channel 380 and Interface Device 330 may be configured as a dual-ring or as a single-ring system, as shown in FIG. 4. The communications management for a single-ring or a dual-ring system is the same. The communications management system manages the receive buffers 470 for receiving data from the channels 410 of the multichannel bidirectional ring and outputting those packets to the ring based network. The communications management system also manages the buffers for obtaining packets or messages from the ring and delivering those packets to the client computer.

Communications Management

All channels will be implemented with a Transfer Information Block (TIB) which contains the necessary information for the Client Interface device 330 to handle messages received by the receive buffers 470 and 480. There are two TIB register sets.

CPU Instruction Set

0010jk Set CA: Set the TIB pointer of channel number Aj to address Ak.

0011jk Set CL: Write the address location pointed to by the TIB pointer of channel Aj with the value in Ak and increment the TIB pointer.

0012j0 Clr CI: Clear the interrupt of channel Aj.

0012j1 Clr Chnl MC: Clear channel Aj and abort any transfers in progress.

033ij0 Read CA: Read the address location pointed to by the TIB pointer of channel Aj into Ai.

MESSAGE IN:

The MSG In TIB has two sets of transfer information (TI) registers and two sets of CA/CL registers. At any given time, one set of CA/CL registers will be in the foreground (FG) and the other in the background (BG). The FG/BG switch occurs when CA=CL for a register set. To set the TIB pointer for MSG In, a Set CA must be issued with Aj set to 20. Ak will get loaded as the TIB pointer address. Each Set CL will write the CL value into the TIB location pointed to by the TIB pointer. The TIB is loaded sequentially by Set CL instructions. After the data is written into the TIB, the TIB pointer is incremented to the next location. A Set CL to locations 2 or 5 (CL) will set the active bit in TI register 0 or 1. A Set CL to locations 1 or 4 (CA) will clear the RPC in TI Register 0 or 1. The address mapping of the TIB is shown in FIG. 8.

TI—Transfer information register

Figure 9:
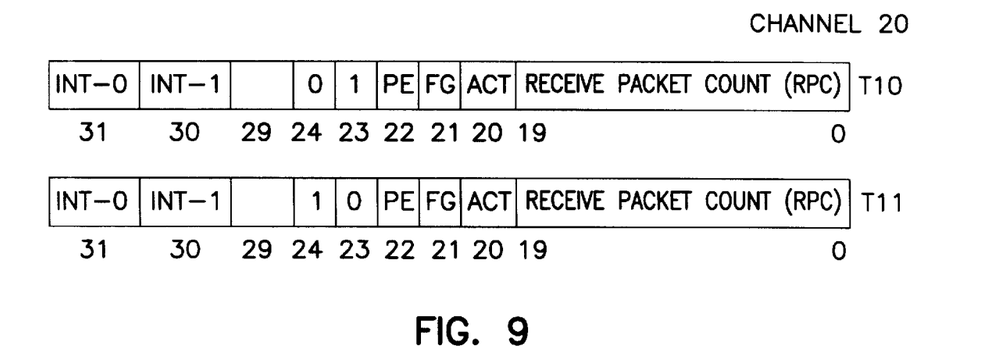
FIG. 9 is a block diagram of the transfer information registers of FIG. 8.

FIG. 9 further details the transfer information (TI) registers of channel 20 shown in FIG. 8. The TI registers are software Read Only and contain MSG In information for the two sets of CA/CL registers. Bits 0–21 of TI register 0, 1 show the status of CA/CL set 0, 1, respectively. Bits 30–31 of both TI registers indicate which channel sent the interrupt. The formats of the TI registers are shown below.

RPC: Bits 0–19 are the receive packet count (RPC) which is a running total of the number of messages in mainframe memory for a set of CA/CL registers. RPC is cleared when CA of a CA/CL set is written.

Act: Bit 20 is an active flag which is set when CL of a CA/CL set is written and cleared when the CA/CL set is sent to the background.

FG: Bit 21 is a flag which states whether the TI register being read is currently in the foreground (1) or the background (0).

PE: Bit 22 sets if FG and ACT are set and a parity error is detected on a message.

Bits 24, 23: TI Register ID bits.

INT-0, INT-1: Bit 31, 30 indicates that CA/CL set 0, 1 sent the interrupt.

MSG In Protocol

To receive messages, a Set CA must be issued and the TIB pointer set to point to CA of a CA/CL set. A Set CL can then be used to write CA followed by another Set CL to write CL. The hardware is now ready to receive messages. When a message has been received, it will be written into mainframe memory and an interrupt will be sent for channel 20. Multiple messages may be written into memory from the time the interrupt is sent and the time software reads the RPC. The interrupt can be processed by reading either TI register to find out which CA/CL sent the interrupt. Once that is determined, the RPC from the proper TI register will indicate how many 35-word message packets are in mainframe memory. After the messages have been processed, a Clr CI can be issued to clear the interrupt and then RPC should be reread to check if any more messages have been written to memory. If so, they should be processed. If RPC is not reread after a Clr CI, unprocessed message packets could be left in memory without interrupt being set. Messages are currently written with the first word indicating the length of the packet which follows.

Initially both FG and BG CA/CL's would be written, thus set active. MSG's will be written into CA/CL set 0 (Buffer A) until CA0=CL0. At this time, the FG/BG switch is made and CA/CL set 0 is set inactive. The Active Bits is in the TI Register. After Buffer A has been emptied, CA/CL set 0 can be reloaded. If the active bit is set in TI register, then CA # CL and obviously CA/CL should not be reloaded. The Active bit is the cue to reload CA/CL.

The hardware will not send an interrupt if no MSG has been sent to memory. The RPC is a running total, not the number of MSG's since the last interrupt. The Interrupt bits in the TI register always indicate which CA/CL pair sent the interrupt. If a FG/BG switch is made before all MSG's have been processed, it is possible for both INT bits to be set.

MESSAGE OUT & MESSAGE OUT PROTOCOL

The MSG Out TIB has one set of CA/CL register's. To send messages, a Set CA must be issued and the TIB pointer set to address 0 (CA). A Set Cl can then be used to write CA followed by another Set CL to write CL. Each time CL is loaded, the ability for channel 21 to interrupt will be turned on and if CL is larger than CA, MSG Out activity will commence. To turn the ability for channel 21 to interrupt off, a Clr CI needs to be issued after CL is set. When CA=CL, output message activity will cease and if interrupt is on, an interrupt on channel 21 will be sent. To resume MSG Out activity, a new CL must be loaded and the ability for Channel 21 interrupt will again be turned on. A Clr CI would again have to be issued to turn interrupt off. Thus, Clr CI has a dual purpose: it will clear interrupt if it set and turn off the ability for channel 21 to interrupt every time it is issued.

Outgoing messages will have the first word indicating the length of the message to be sent. The "out of band word" will not be sent onto ring.

Advantageously, the communication controller allows for minimal processor interruption when transferring messages into or out of either a receive buffer or a send buffer. Since the communication controller increments a counter within the receive buffer when messages are input to a buffer to produce a counter having an address or a value associated therewith that is reflective of the last received message, when outputs need to be sent from the send buffer, the communication controller can merely send messages until the value of the counter is equal to the value associated with the address for a particular message. When the counter value equals the limit address associated with a message, the communication controller then stops sending messages. The advantage is that in the past, various flags and interrupts had to be used to indicate when a single message was complete. For example, if four messages were sent into a receive buffer, four interrupts would be processed by the processor to receive the four messages. Under the current communications controller, time is saved since the messages into the buffer do not require the processing of an interrupt. The messages are received and a counter is incremented to reflect the receipt of the message. Therefore, several messages can be processed on a single interrupt. The subsequent messages do not need to process an interrupt if received before the first interrupt is completed. By the same token, when sending messages out from the send buffer, a number of message end commands do not have to be processed. The end result is a network that is capable of getting multiple messages or packets of information into and out of the send and receive buffers, with minimal overhead and minimal processing.

Although specific embodiments have been illustrated and described herein, it will be appreciated by those of ordinary skill in the art that any arrangement which is calculated to achieve the same purposes may be substituted for the specific embodiment shown. This application is intended to cover any adaptations or variations of the present invention.

Therefore, it is manifestly intended that this invention be limited only by the claims and the equivalents thereof.

We claim:

1. A method for handling communications to and from memory associated with a central processing unit having a plurality of input buffers and an output buffer, said central processing unit attached to a computer network, said method comprising:

receiving a message in a receive buffer and generating an interrupt indicating the received message;

receiving at least one additional message in the receive buffer without using additional interrupts for such further received messages;

adding a length of each message to a receive input counter to produce a receive input counter value; and sending the at least one additional message from the receive buffer and adding the length of each message sent to an output counter and sending the at least one additional message until a value of the output counter equals the value of the receive input counter.

2. The method for handling communications to and from memory associated with a central processing unit of claim 1 further comprising disregarding an interrupt produced by a subsequent input message when the receive buffer is receiving a message, said receive input counter being incremented upon receiving the subsequent message in the receive input buffer.

3. The method for handling communications to and from memory associated with a central processing unit of claim 1 further comprising:

adding the at least one additional message to a first portion of memory until the first portion memory is full; and adding subsequent messages to the at least one additional message to a second portion of memory in response to the first portion of memory being full.

4. The method for handling communications to and from memory associated with a central processing unit of claim 3 wherein adding subsequent messages of the at least one additional message to a second portion of memory in response to the first portion of memory being full is further comprised of:

designating the first portion of memory inactive; and designating the second portion of memory as active.

5. A method for handling communications to and from memory associated with a central processing unit comprising:

receiving a plurality of input messages into a receive buffer;

incrementing a receive input counter upon receiving the plurality of input messages in the receive buffer;

moving the input messages from the receive buffer;

adding the moved input messages to a foreground portion of memory until the foreground portion of memory is full; and adding the moved input messages to a background portion of memory in response to the foreground portion of memory being full.

6. The method for handling communications to and from memory associated with a central processing unit of claim 5 further comprising designating the background portion of the memory as the foreground portion of the memory.

7. The method for handling communications to and from memory associated with a central processing unit of claim 5 further comprising designating the foreground portion of the memory as the background portion of the memory.

8. The method for handling communications to and from memory associated with a central processing unit of claim 5 further comprising switching between the foreground portion of the memory and the background portion of the memory as the foreground portion of memory becomes full.

9. The method for handling communications to and from memory associated with a central processing unit of claim 5 further comprising prioritizing the order in which messages are output from the receive buffer to a client computer associated with a node.

10. The method for handling communications to and from memory associated with a central processing unit of claim 9 wherein prioritizing the order in which messages are output from the receive buffer is based upon an indication format a source computer from which the message was delivered.

11. A method for handling communications to and from memory associated with a central processing unit comprising:

placing a first message in a send buffer;

incrementing a send buffer counter upon placing the first message in the send buffer by adding the length of the message to the send buffer counter to produce a first send buffer counter value, and sending an interrupt indicative of the first message.

placing a second message in a send buffer; and incrementing the send buffer counter upon placing the second message in the send buffer by adding the length of the message to the send buffer counter to produce a second send buffer counter value, without sending an additional interrupt.

12. The method for handling communications to and from memory associated with a central processing unit of claim 11 further comprising prioritizing an order in which the first and second messages are sent from the send buffer based upon which one of a plurality of target computers the message is to be delivered to.

13. A computer network system, comprising:

a plurality of network nodes, wherein each network node comprises:

a client computer which communicates with packet messages; and a communications controller linking the client computer to the computer network, wherein the communications controller further comprises:

a receive buffer that receives a plurality of messages;

an interrupt generator that is set when a first message of the plurality of messages is received into the receive buffer, and that generates only one interrupt for each time the interrupt generator is set, and that is cleared when all messages in the receive buffer are sent;

a receive buffer counter associated with the receive buffer; and a receive buffer counter associated with the receive buffer, the communications controller incrementing the receive buffer counter upon receiving the message in the receive buffer to produce a receive buffer counter value associated with the last address of the last message received, the communications controller sending messages from the receive buffer.

14. The computer network system as recited in claim 13, wherein the communications controller further comprises:

a foreground portion of memory; and a background portion of memory.

15. The computer network system, as recited in claim 13, wherein the communications controller further comprises:

a foreground portion of memory; and a background portion of memory, wherein the communications controller adds messages to the foreground portion of memory until the foreground is full and then adds messages to the background portion of memory.

16. The computer network system, as recited in claim 15 further comprising a switch that switches the foreground portion of memory to the background portion of memory and the background portion of memory to the foreground portion of memory.

17. The computer network as recited in claim 15 further comprising a receive message controller for switching the foreground portion of memory to the background portion of memory and for switching the background portion of memory to the foreground portion of memory.

18. The computer network system, as recited in claim 16, wherein the switch further comprises:

a comparator that compares the receive buffer counter value to the value to a maximum counter value for the foreground portion of the memory and switches to the background in response to the maximum counter value equaling the receive buffer counter value.

19. The computer network system, as recited in claim 13, further comprising:

a message send buffer; and a send buffer counter associated with the message send buffer.

20. The computer network system, as recited in claim 13, further comprising:

a message send buffer; and a send buffer counter associated with the message send buffer, the communications controller incrementing a send buffer counter upon receiving the message in the send buffer to produce a send buffer counter value, the communications controller sending messages from the send buffer.

21. A communications controller comprising:

a receive buffer that receives a plurality of messages;

an interrupt generator that is set when a first message of the plurality of messages is received into the receive buffer, and that generates only one interrupt for each time the interrupt generator is set, and that is cleared when all messages in the receive buffer are sent;

a counter associated with the receive buffer; and a receive buffer controller associated with the receive buffer, the receive buffer controller incrementing the counter associated with the receive buffer to a last receive buffer address when a second message is received before an interrupt for the first message is cleared.

22. The communications controller of claim 21, wherein the receive buffer comprises:

a foreground receive buffer; and a background receive buffer, the receive buffer controller adding messages to the foreground receive buffer until the foreground receive buffer is full and then switching the foreground receive buffer to the background receive buffer.

23. The communications controller of claim 21, further comprising:

a send buffer, a send buffer controller associated with the send buffer, the send buffer controller incrementing a counter associated with the send buffer to a last send buffer address when a second message is received while sending a first message, the send buffer sending the first and second messages before resetting an interrupt associated with the first message.

24. A method for handling communications to and from memory associated with a central processing unit, the central processing unit attached to a computer network, the method comprising:

receiving a message in a send buffer;

incrementing a receive input counter upon receiving the message in the send buffer by adding the length of the message to the receive input counter to produce a receive input counter value; and sending messages from the send buffer, wherein the length of each message sent is added to a send input counter to produce a send input counter value, until the send input counter value is equal to the receive input counter value.

25. The method of claim 24 further comprising dividing the send buffer into two buffers.

26. The method of claim 24 further comprising dividing the send buffer into a plurality of buffers and designating at least one of the plurality of buffers as foreground buffers.

27. The method of claim 24, further comprising:

receiving a message in a receive buffer and generating an interrupt indicating the received message; and receiving at least one additional message in the receive buffer without using additional interrupts for such further received messages.

28. The method of claim 26 further comprising:

adding the at least one additional message to a first portion of memory until the first portion memory is full; and adding subsequent messages to the at least one additional message to a second portion of memory in response to the first portion of memory being full.

* * * * *

UNITED STATES PATENT AND TRADEMARK OFFICE
CERTIFICATE OF CORRECTION

PATENT NO.   : 6,256,677 B1
DATED        : July 3, 2001
INVENTOR(S)  : Richard D. Pribnow, Michael T. Bye, James G. Bravatto, John Theodore Kline It is certified that error appears in the above-identified patent and that said Letters Patent is hereby corrected as shown below:

Title page,
Item [57], under "ABSTRACT", delete "controller for controller" and insert -- controller for controlling --, therefor.

Column 3,
Line 5, delete "the" between "of" and "an interface".

Column 5,
Lines 45-46, insert -- that -- between "computers" and "is assigned".

Column 7,
Line 25, delete "620 of course" and insert -- 620. Of course, --, therefor.

Column 10,
Line 27, insert -- is -- between "if it" and "set".

Column 12, claim 10,
Line 13, delete "format" and insert -- from --, therefor.

Signed and Sealed this

Twenty-fifth Day of December, 2001

Attest:

*Attesting Officer*

JAMES E. ROGAN
*Director of the United States Patent and Trademark Office*